United States Patent
Baumgartner et al.

(10) Patent No.: US 10,698,987 B2
(45) Date of Patent: Jun. 30, 2020

(54) SYSTEMS AND METHODS FOR BINDING CONTENT PLAYBACK TO THE PAIRING OF A PLAYBACK DEVICE AND REMOVABLE MEMORY STORAGE DEVICE

(71) Applicant: DIVX, LLC, San Diego, CA (US)

(72) Inventors: Hans Andreas Baumgartner, San Diego, CA (US); Mayur Srinivasan, San Diego, CA (US); Jason Braness, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

(21) Appl. No.: 15/710,495

(22) Filed: Sep. 20, 2017

(65) Prior Publication Data

US 2018/0011993 A1 Jan. 11, 2018

Related U.S. Application Data

(63) Continuation of application No. 14/728,997, filed on Jun. 2, 2015, now Pat. No. 9,798,865.
(Continued)

(51) Int. Cl.
*G06F 21/10* (2013.01)
*H04L 29/06* (2006.01)

(52) U.S. Cl.
CPC ............ *G06F 21/105* (2013.01); *H04L 63/10* (2013.01); *G06F 2221/0704* (2013.01)

(58) Field of Classification Search
CPC . G06F 7/04; G06F 15/16; G06F 9/445; G06F 3/00; G06F 21/00; G06F 21/10;
(Continued)

(56) References Cited

U.S. PATENT DOCUMENTS 8,763,157 B2 * 6/2014 Navar .................. G06F 21/10
726/27
9,549,000 B2 * 1/2017 Panje .................. H04L 65/60
(Continued)

FOREIGN PATENT DOCUMENTS

WO 2015187740 A1 12/2015

OTHER PUBLICATIONS

International Preliminary Report on Patentability for International Application PCT/US2015/033843, Report issued Dec. 6, 2016, dated Dec. 15, 2016, 9 pgs.
(Continued)

*Primary Examiner* — Thanhnga B Truong
(74) *Attorney, Agent, or Firm* — KPPB LLP

(57) ABSTRACT

Systems and methods for binding content to pairing of a playback device and removable memory storage device are disclosed. In one embodiment, a method for requesting authorization to play content using a playback device and a removable memory storage device includes retrieving a coupon identifier from a removable memory storage device while it is attached to the playback device, generating a coupon code using the coupon identifier, sending a request for storefront token that includes a device match data token and an application identifier, receiving a storefront token associated with a storefront identifier where the storefront identifier identifies a storefront application, sending a request for ticket token that includes the coupon code, the storefront identifier, and a content identifier that identifies the content, sending a request for license file that includes the ticket token, and receiving a license file that grants playback rights to the piece of content.

20 Claims, 7 Drawing Sheets

Related U.S. Application Data

(60) Provisional application No. 62/007,315, filed on Jun. 3, 2014, provisional application No. 62/006,797, filed on Jun. 2, 2014.

(58) Field of Classification Search
CPC .......... G06F 21/105; G06F 2221/0704; H04L 63/10; H04L 29/06; H04L 65/4069; H04L 65/601; H04N 21/438; H04N 21/2343; H04N 21/845; H04N 21/854; H04N 21/23439; H04N 21/4384; H04N 21/8455; H04N 21/85406; H04N 21/8456
USPC .............. 726/26, 27, 30; 705/59; 713/176; 709/223; 715/706, 733; 84/609, 612
See application file for complete search history.

(56) References Cited

U.S. PATENT DOCUMENTS

| | | | |
|---|---|---|---|
| 9,798,865 B2 | 10/2017 | Baumgartner et al. | |
| 2003/0070181 A1 | 4/2003 | Holm et al. | |
| 2003/0120943 A1 | 6/2003 | Hughes et al. | |
| 2005/0065891 A1* | 3/2005 | Lee .................. | G06F 21/10 705/59 |
| 2008/0168568 A1 | 7/2008 | Brodersen et al. | |
| 2008/0172718 A1* | 7/2008 | Bradley ............. | G06F 21/10 726/1 |
| 2008/0294894 A1 | 11/2008 | Dubhashi et al. | |
| 2009/0012805 A1* | 1/2009 | Schnell ............. | G06Q 30/06 705/310 |
| 2009/0228395 A1 | 9/2009 | Wegner et al. | |
| 2012/0060031 A1* | 3/2012 | Huang ............... | H04L 9/083 713/168 |
| 2012/0173751 A1 | 7/2012 | Braness et al. | |
| 2013/0006869 A1 | 1/2013 | Grab et al. | |
| 2013/0007443 A1 | 1/2013 | Grab et al. | |
| 2013/0007467 A1 | 1/2013 | Chan et al. | |
| 2013/0007471 A1 | 1/2013 | Grab et al. | |
| 2013/0044821 A1 | 2/2013 | Braness et al. | |
| 2013/0054960 A1 | 2/2013 | Grab et al. | |
| 2013/0179199 A1 | 7/2013 | Ziskind et al. | |
| 2013/0179992 A1 | 7/2013 | Ziskind et al. | |
| 2014/0068030 A1 | 3/2014 | Chambers et al. | |
| 2014/0101722 A1* | 4/2014 | Moore ............... | H04L 63/062 726/4 |
| 2015/0347722 A1 | 12/2015 | Baumgartner | |

OTHER PUBLICATIONS

International Search Report and Written Opinion for International Application PCT/US2015/033843, Report Completed Aug. 18, 2015, dated Sep. 3, 2015, 9 pgs.

Honorof, Marshall, "Samsung Offers Limited Content for 4K UHD TVs", Tom's Guide, Mar. 20, 2014, retrieved from https://www.tomsguide.com/us/samsung-ultra-hd-content,news-18510.html on Jul. 13, 2017, 3 pages.

Parsons, Tom, "Samsung UHD Video Pack is a 4K hard drive that makes even rubbish films look pretty", Stuff, Mar. 11, 2014, retrieved from https://www.stuff.tv/news/samsung-uhd-video-pack-4k-hard-drive-makes-even-rubbish-films-look-pretty on Jul. 13, 2017, 3 pages.

\* cited by examiner

SYSTEMS AND METHODS FOR BINDING CONTENT PLAYBACK TO THE PAIRING OF A PLAYBACK DEVICE AND REMOVABLE MEMORY STORAGE DEVICE

CROSS-REFERENCE TO RELATED APPLICATIONS

The current application is a continuation of U.S. patent application Ser. No. 14/728,997, filed Jun. 2, 2015, entitled "Systems and Methods for Binding Content Playback to the Pairing of a Playback Device and Removable Memory Storage Device" to Baumgartner et al., which claims priority to U.S. Provisional Patent Application No. 62/007,315, filed Jun. 3, 2014, entitled "UHD Showcase" to Baumgartner et al., and to U.S. Provisional Patent Application No. 62/006,797, filed Jun. 2, 2014, entitled "UHD Showcase" to Baumgartner et al., the disclosures of which are incorporated herein by reference in their entireties.

FIELD OF THE INVENTION

The present invention relates generally to playback of digital multimedia content and more specifically to techniques for binding the ability to play back a particular piece of content to a pairing between a removable memory storage device and a playback device that the storage device may be attached to.

BACKGROUND OF THE INVENTION

When a customer visits a movie theater, the process typically involves purchasing a "ticket" at the ticket booth and having the ticket "torn" when the customer enters the theater. A ticket serves as a physical proof of purchase for the right to view a particular movie. When a ticket is claimed by entering the theater and being torn, the ticket is thought to be redeemed by the customer presenting the ticket and henceforth the viewing rights granted by the ticket are owned by that customer.

In a digital multimedia playback system, viewing rights are generally governed by possession of physical media that contains digital content. When the content is not tied to physical media, such as when digital content is streamed over a network, a digital rights management (DRM) system is often used to restrict access to the content. Such systems typically involve user accounts and associating purchased content with a user account. A playback device may be registered to a user account and then have access to the content purchased under that user account.

SUMMARY OF THE INVENTION

Systems and methods for binding content playback to the pairing of a playback device and removable memory storage device are disclosed. In one embodiment, a method for requesting authorization to play back a piece of content using a playback device and a removable memory storage device includes determining, using a playback device, whether a license file exists for providing the playback device with rights to play a piece of content, retrieving at least one coupon identifier from a removable memory storage device while it is attached to the playback device, generating a coupon code using the playback device using at least one coupon identifier, sending a request for a storefront token using the playback device, where the request for a storefront token includes a device match data token and an application identifier, receiving a storefront token using the playback device, where the storefront token is associated with a storefront identifier and the storefront identifier identifies a storefront application on the playback device, sending a request for a ticket token using the playback device, where the request for a ticket token includes the coupon code, the storefront identifier, and a content identifier that identifies the piece of content, receiving a ticket token using the playback device, sending a request for a license file using the playback device, where the request for a license file includes the ticket token, and receiving a license file using the playback device, where the license file grants the playback device playback rights to the piece of content.

In a further embodiment, the method also includes retrieving a product identifier using the playback device, where the product identifier identifies the type of product of the playback device.

In another embodiment, the request for a ticket token also includes the product identifier.

In a still further embodiment, the method also includes retrieving a merchant identifier using the playback device.

In still another embodiment, the request for a ticket token also includes the merchant identifier.

In a yet further embodiment, the method also includes detecting an attached removable memory storage device using the playback device.

In yet another embodiment, the method also includes receiving a request for playback of the piece of content using the playback device.

In a further embodiment again, the playback rights to the piece of content include limitations to play back the content within a predetermined time period.

In another embodiment again, the predetermined time period is a time window commencing from first playback of the content.

In a further additional embodiment, the predetermined time period is a time window commencing when the license file was provided.

In another additional embodiment, the piece of content is stored on the removable memory storage device.

In a still yet further embodiment, the method also includes receiving the request for a ticket token using a content access control server, verifying whether the coupon code has been associated with a storefront identifier using the content access control server, sending the storefront token to a digital rights management (DRM) server using the content access control server, receiving the storefront identifier from the DRM server in response to the storefront token using the content access control server, associating the coupon code with the storefront identifier using the content access control server, sending a request for a ticket token to the DRM server using the content access control server, where the request for a ticket token includes the content identifier and the storefront identifier, receiving a ticket token using the content access control server, and sending the ticket token to the playback device using the content access control server.

In still yet another embodiment, the method also includes verifying that the product identifier identifies a product that is valid for the coupon code.

In a still further embodiment again, the method also includes locating and retrieving a license identifier associated with the coupon code and where the request for a ticket token also includes the license identifier.

In still another embodiment again, the method also includes retrieving merchant credentials using the content access control server and connecting to a DRM server using the merchant credentials.

In a still further additional embodiment, the method also includes associating the coupon code with the content identifier.

In still another additional embodiment, the playback device determines whether a license file exists using a manifest file.

In a yet further embodiment again, the manifest file is a SMIL file that provides the also indicates location of the content.

In yet another embodiment again, the method also includes retrieving the content identifier from the SMIL file.

In a yet further additional embodiment, a method for requesting authorization to play back a piece of content using a playback device and a removable memory storage device includes determining, using a playback device, whether a license file exists for providing the playback device with rights to play a piece of content, retrieving at least one coupon identifier from a removable memory storage device while it is attached to the playback device, generating a coupon code using the playback device using at least one coupon identifier, sending a request for a storefront token using the playback device, where the request for a storefront token includes a device match data token and an application identifier, receiving a storefront token using the playback device, where the storefront token is associated with a storefront identifier and the storefront identifier identifies a storefront application on the playback device, sending a request for a ticket token using the playback device, where the request for a ticket token includes the coupon code, the storefront identifier, and a content identifier that identifies the piece of content, receiving a ticket token, sending a request for a license file using the playback device, where the request for a license file includes the ticket token, receiving a license file using the playback device, where the license file grants the playback device playback rights to the piece of content, receiving the request for a ticket token using a content access control server, verifying whether the coupon code has been associated with a storefront identifier using the content access control server, sending the storefront token to a digital rights management (DRM) server using the content access control server, receiving the storefront identifier from the DRM server in response to the storefront token using the content access control server, associating the coupon code with the storefront identifier using the content access control server, sending a request for a ticket token to the DRM server using the content access control server, where the request for a ticket token includes the content identifier and the storefront identifier, receiving a ticket token using the content access control server, and sending the ticket token to the playback device using the content access control server.

In yet another additional embodiment, a system for requesting authorization to play back a piece of content includes a playback device including a processor, and memory including a storefront application and a playback application, the processor is configured by the storefront application to determine whether a license file exists for providing rights to play a piece of content, retrieve at least one coupon identifier from a removable memory storage device while it is attached to the playback device, generate a coupon code using at least one coupon identifier, send a request for a storefront token, where the request for a storefront token includes a device match data token and an application identifier, receive a storefront token, where the storefront token is associated with a storefront identifier and the storefront identifier identifies the storefront application on the playback device, send a request for a ticket token, where the request for a ticket token includes the coupon code, the storefront identifier, and a content identifier that identifies the piece of content, receive a ticket token, send a request for a license file, where the request for a license file includes the ticket token, and receive a license file, where the license file grants the playback device playback rights to the piece of content.

In still another embodiment again, the system also includes a content access control server including a processor, and memory including a content access control application, the processor is configured by the content access control application to: receive a request for a ticket token, verify whether the coupon code has been associated with a storefront identifier, send the storefront token to a digital rights management (DRM) server, receive the storefront identifier from the DRM server in response to the storefront token, associate the coupon code with the storefront identifier, send a request for a ticket token to the DRM server, where the request for a ticket token includes the content identifier and the storefront identifier, receive a ticket token, and send the ticket token to the playback device.

DETAILED DISCLOSURE OF THE INVENTION

Figure 1:
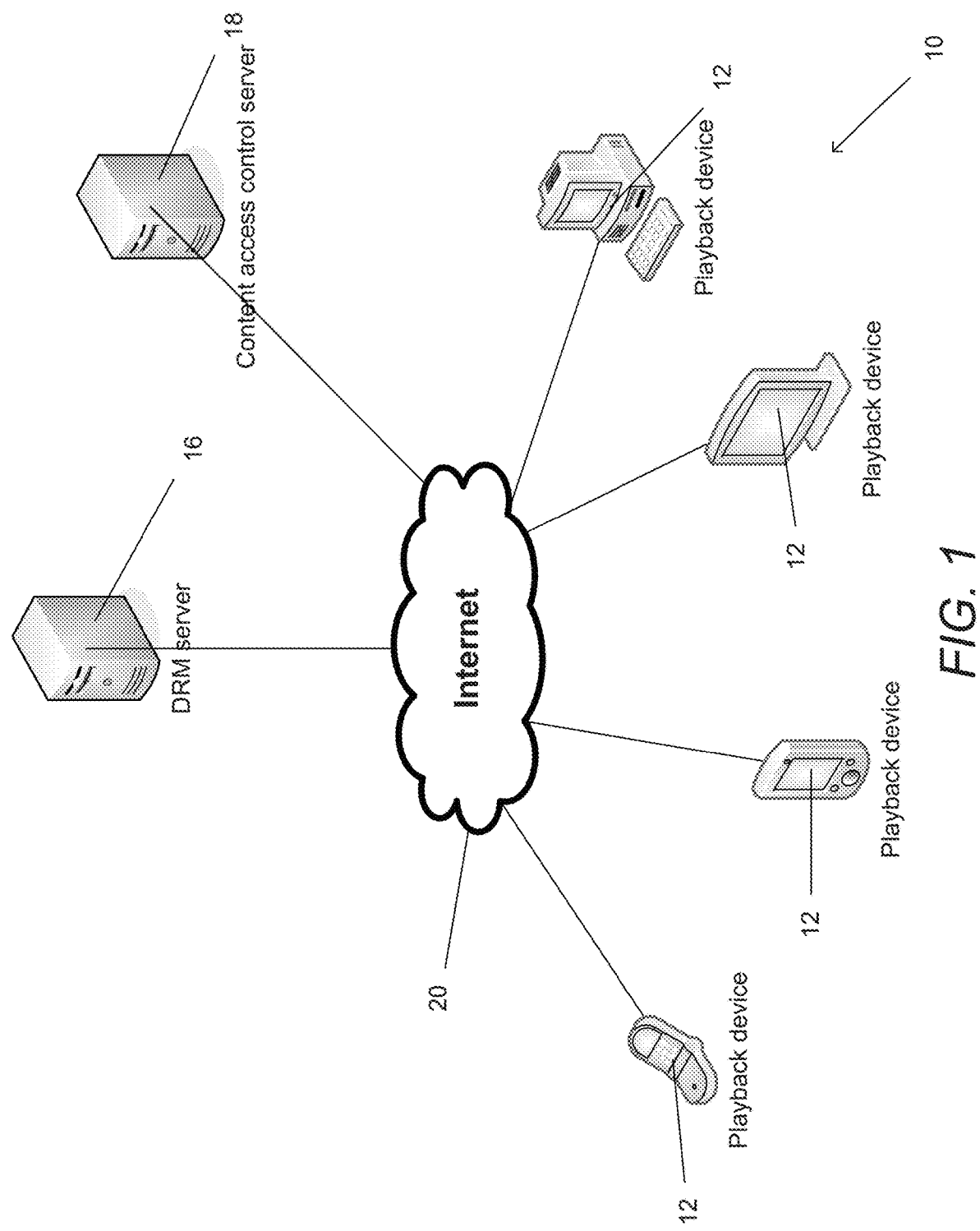
FIG. 1 is a system-level overview illustrating a DRM and content distribution system in accordance with an embodiment of the invention.

Turning now to the drawings, systems and methods for binding content playback to the pairing of a playback device and removable memory storage device in accordance with embodiments of the invention are disclosed. In various embodiments, playback of a piece of content may be authorized for a pairing of a particular playback device and a particular removable memory storage device (such as a USB drive) that can be attached to the playback device. Authorization may be performed using information such as, but not limited to, uniquely identifying information about the playback device, applications (such as playback or storefront applications) on the playback device, the removable memory storage device, and/or components of the removable memory storage device. In further embodiments, a request for authorization or other playback-enabling information that does not include the same combination of identifying information may not receive the same authorization or may be prevented from obtaining authorization.

Multimedia content is widely available by streaming over the internet and with local copies on memory storage devices. Typically, playback is restricted with controls such as by associating content with authorized user accounts. Many embodiments of the invention discussed below provide mechanisms to bind content such that a piece of content is authorized to play when a specific removable memory storage device, such as a USB memory stick or USB hard drive, is attached to a specific playback device, such as a television.

Tokens can be used as a temporary credential to maintain a communication session between a server and playback device so that the device does not have to identify itself and send other credentials which may be a larger amount of data. Tokens can also be a smaller representation of a larger set of data. The processes discussed below utilize several different types of tokens as temporary credentials.

In several embodiments, when a device has opened a session with a server, it may obtain one or more tokens to keep the session open without having to send sensitive information and re-verify. In further communications with the server, the device can use the token to identify itself. The server may determine when a session is complete and expire the token, or expire the token after a certain amount of time has passed or uses of the token have occurred.

A ticket token can be generated and associated with an electronic ticket as a temporary credential, which can be exchanged for an electronic ticket, license file, cryptographic information and/or other playback credentials by a playback device that is registered with a DRM system. In several embodiments, the playback device requests a ticket token from the server when the user purchases or initializes content playback for the first time. The request may contain information such as (but not limited to) a storefront identifier, a content identifier, a merchant identifier, an account link identifier, a license identifier, a stream identifier, a transaction identifier, currency, and/or price. The ticket token that is returned may reference the electronic ticket, customer, and current content request. When the playback device requests playback, the playback device can exchange the ticket token for an electronic ticket.

System Architecture

A system including playback devices that can communicate with DRM servers and content servers to access digital content in accordance with an embodiment of the invention is illustrated in FIG. 1. The system 10 includes a number of different types of playback device 12 that each has the capability to request digital content over a network or play back content that is stored locally on the playback device or attached removable memory storage devices (such as USB drives or memory sticks). Playback devices can include devices such as, but not limited to, televisions (TVs), Blu-ray or DVD players, set-top boxes, and video game systems. The playback devices 12 may communicate with a digital rights management (DRM) server 16 and content server access control 18 over a network such as the Internet 20. The DRM server 16 can be used to authenticate playback devices 12 and provide cryptographic information used to access digital content. In several embodiments, the content access control server 18 is a server that interfaces between playback devices 12 and DRM server 16 and maintains an association of content to the particular combination of playback device and removable memory storage device that is authorized to access the content. In addition, content delivery servers can deliver digital content to the playback devices 12. The content can be downloaded and/or streamed by the playback devices 12.

An electronic ticket, ticket token, and/or license file issued by the DRM server in response to the purchase of content that serves as a representation of the purchase can be used to facilitate access of the purchased content in a coordinated fashion among the playback device 12, DRM server 16, and content access control server 18. In many embodiments, the communications between an authenticated playback device 12 and the DRM server 16 may be sensitive and so several tokens, such as a storefront token and/or a ticket token, are used as temporary credentials. Accordingly, the DRM server 16 can issue a storefront token and/or ticket token to the playback devices 12 and/or content access control server 18 that acts as a temporary credential. In several embodiments, the storefront token is a single use credential that can be utilized by a playback device that authenticates itself to the DRM server to obtain the ticket token and the ticket token enables the playback device to obtain cryptographic information enabling playback of the content.

Although a specific architecture is shown in FIG. 1 any of a variety of architectures can be utilized that enable playback devices to securely access digital content using electronic tickets and ticket tokens in accordance with embodiments of the invention. For example, each of the servers illustrated in FIG. 1 can be a server system comprising multiple load balanced servers and/or servers that perform different functions. In addition, the functions of the servers illustrated in FIG. 1 can be combined and/or divided amongst different servers and server systems in accordance with embodiments of the invention. The use of storefront tokens and ticket tokens to access digital content in accordance with embodiments of the invention is discussed further below.

Each device or server may have a processor configured by software to perform various functions including playback of content. Various software modules may configure the processor of a playback device or server to perform processes including the processes discussed below.

Playback Devices

Figure 2:
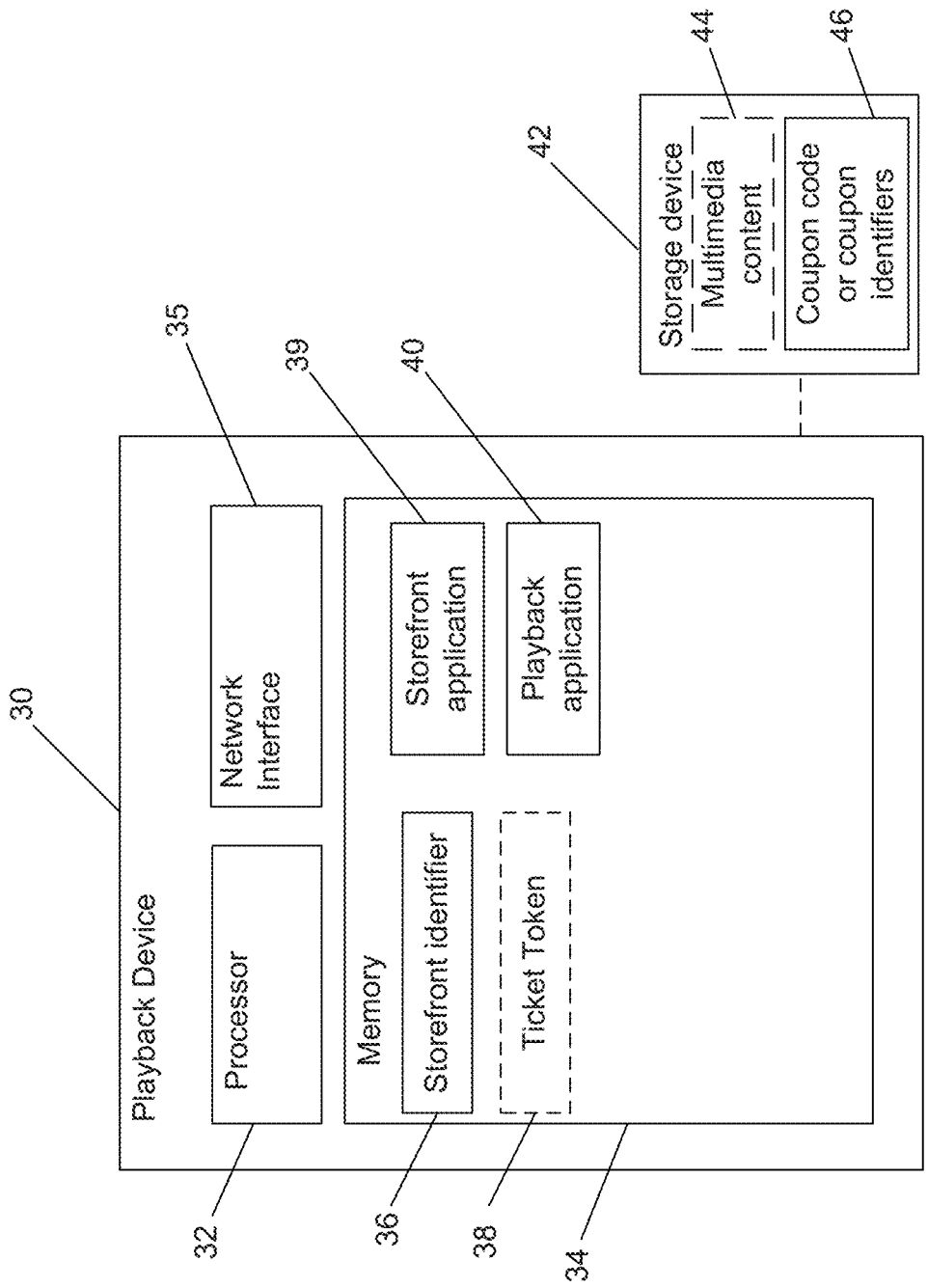
FIG. 2 conceptually illustrates a playback device having an attachable, removable memory storage device in accordance with an embodiment of the invention.

In many embodiments of the invention, a storefront application and/or other software enables a playback device to access content through a DRM system where the content and/or credentials enabling access to the content is stored on a removable memory storage device that can be attached to the playback device. A playback device configured to access content in accordance with an embodiment of the invention is shown in FIG. 2. The playback device 30 includes a processor 32, memory 34, and a network interface 35. In the illustrated embodiment, the storefront identifier 36 and ticket token 38 can be stored in memory. Typically, the memory is non-volatile memory to provide persistent storage of the storefront identifier 36 and the ticket token 38. A removable memory storage device 42, such as a USB memory stick or USB hard drive, can be attached to the playback device. The removable memory storage device 42 can include a coupon code 44 and multimedia content 46. In some embodiments, the multimedia content may be accessed from a content server instead.

In several embodiments, a storefront application 39 may configure the playback device to communicate with the DRM server to access content and obtain ticket tokens. The storefront application 39 may also configure the playback device to authentic itself with a DRM server and to request cryptographic information to play back content using a ticket token and/or exchange the ticket token for an electronic ticket. The storefront application 39 or a playback application 40 may configure the playback device to play back the content. Although a specific playback device architecture is illustrated in FIG. 2, any of a variety of architectures that are capable of managing interactions with servers and playback of digital content in the manner outlined above can be utilized in accordance with embodiments of the invention.

DRM Servers

Figure 3A:
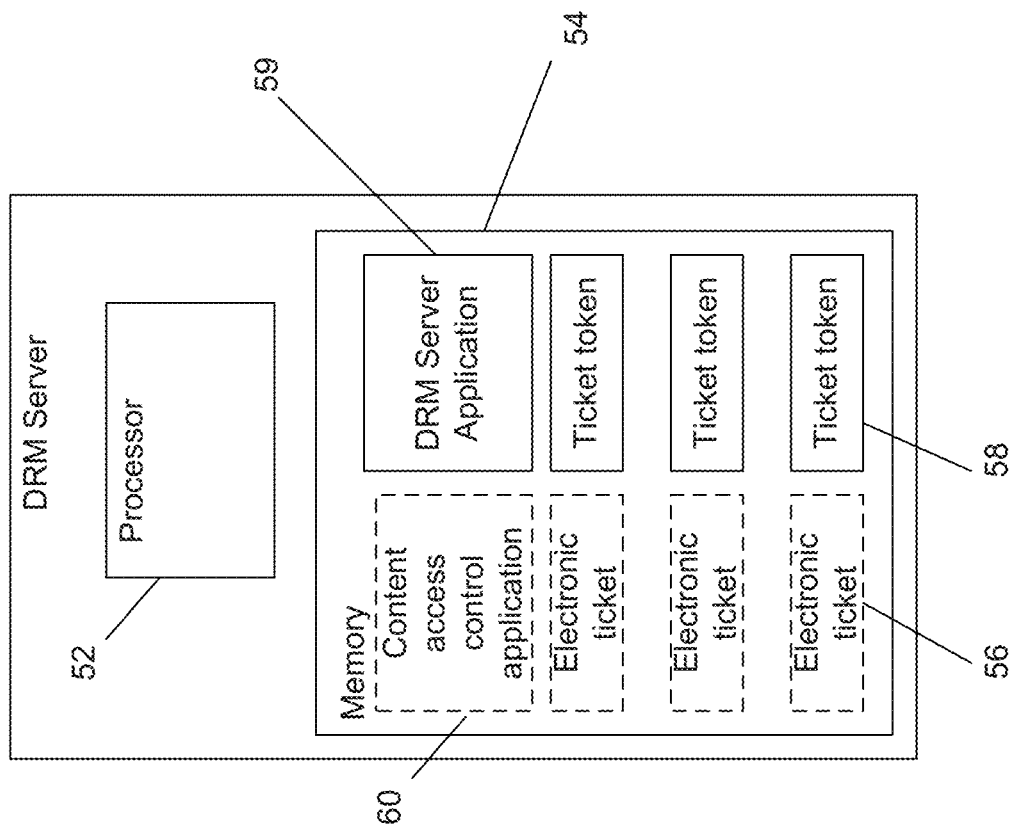
FIG. 3A conceptually illustrates a DRM (digital rights management) server for providing access to content in accordance with an embodiment of the invention.

In many embodiments of the invention, the associations between storefront identifiers, coupon codes, and content identifiers may be stored on a DRM server (e.g., in a database) for reference, to track what content any particular device is permitted to play, and to provide user devices with access to content. A DRM server configured to associate storefront applications with coupon codes and content and to provide cryptographic information enabling playback of DRM protected content in accordance with an embodiment of the invention is shown in FIG. 3A. The DRM server includes a processor 52 and non-volatile memory 54. In the illustrated embodiment, the memory 54 includes DRM server application 59 and multiple electronic tickets 56 and ticket tokens 58. In other embodiments, a DRM server may generate ticket tokens but not store or generate electronic tickets. As is discussed further below, the DRM server can be configured by DRM server application 59 to manage the association of storefront identifiers with coupon codes and content, the issuance of ticket tokens associated with granted access to content, and the association of electronic tickets and/or ticket tokens with users and/or user devices such as by the processes discussed further below. In addition, the DRM server application 59 can manage the issuance of cryptographic information (not shown) to playback devices that are authorized to playback content, the authorization of which is evidenced by an electronic ticket. Processes utilizing DRM servers configured by DRM applications to authorize playback of content in accordance with embodiments of the invention are discussed further below.

Although a specific DRM server architecture is illustrated in FIG. 3A, any of a variety of architectures that are capable of managing interactions with servers and playback of digital content in the manner outlined above can be utilized in accordance with embodiments of the invention.

Content Access Control Application and Content Access Control Server

In several embodiments of the invention, a DRM server also includes a content access control (CAC) application 60. In other embodiments, a content access control application may execute on a separate content access control server. A content access control application can serve as an intermediary or interface between a playback device and the DRM server application. In systems where a DRM server application utilizes merchant accounts to compartmentalize or segregate different types of access to content, the content access control application can interact with the DRM server application as if it were a merchant, e.g., using merchant credentials for a merchant account.

Figure 3B:
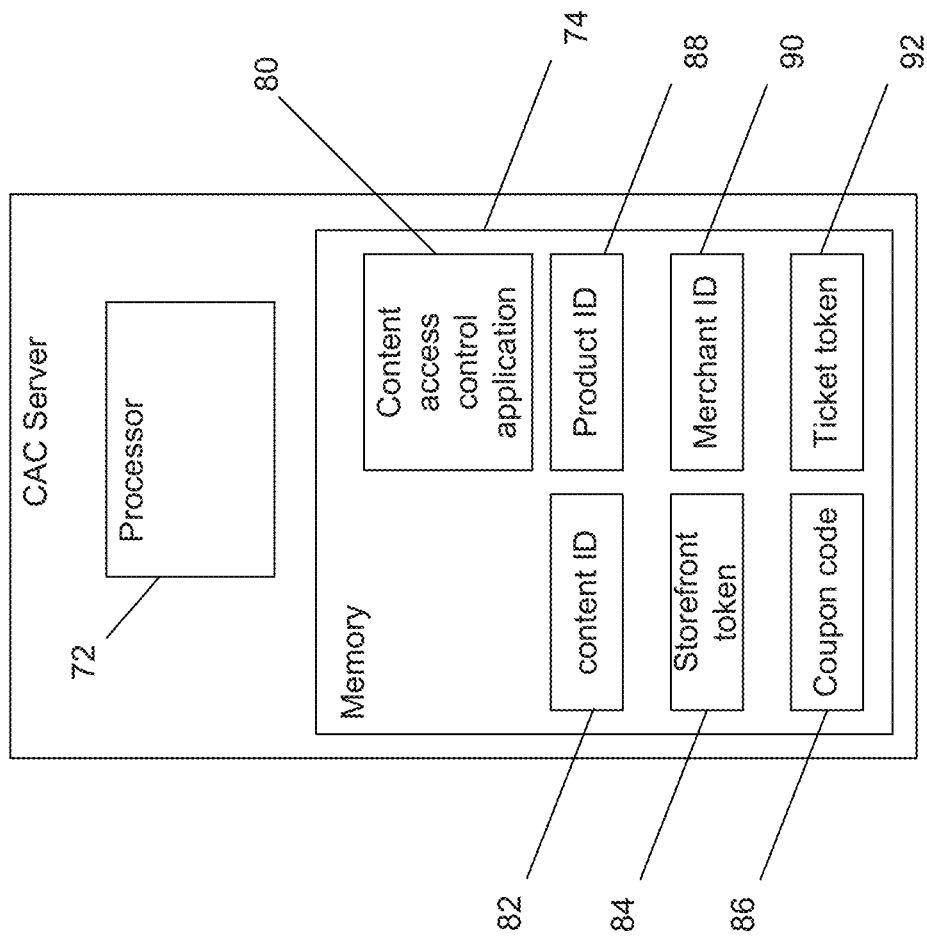
FIG. 3B conceptually illustrates a content access control server for mediating playback authorization between a playback device and a DRM server in accordance with an embodiment of the invention.

A content access control server configured to interface between a playback device and a DRM server in accordance with embodiments of the invention is illustrated in FIG. 3B. The content access control server includes a processor 72 and non-volatile memory 74. In the illustrated embodiment, the memory 74 includes a content access control application 80 that, when executed, configures the processor 72 to perform processes such as those discussed below to obtain authorization for a playback device to play content given a particular coupon code. As will be discussed through the processes below, the memory 74 may also contain at various times a content identifier 82, storefront token 84, coupon code 86, product identifier 88, merchant identifier 90, and/or ticket token 92. The content access control server may also obtain merchant credentials corresponding to the merchant identifier 90, which it may use to perform authorized transactions with a DRM server, or in different embodiments, a DRM server application when a CAC application and DRM application are on the same server.

Storefront Application

In a number of embodiments, a "store front" like interface is accessible to customers via a web browser or other application on their playback device. In many embodiments of the invention, an application or software module acts as a storefront application that runs on a playback device that allows a user to select a piece of multimedia content for playback and interacts with remote servers to authenticate playback. A storefront can have a graphical interface or may execute in the background without a graphical interface. An instance of a storefront application (e.g., a copy installed and/or executing on a particular playback device) may be uniquely identified by a storefront identifier. In several embodiments, a storefront identifier can be a combination of a device match data token and an application identifier. In other embodiments, a storefront identifier may be a distinct identifier associated with a combination of a device match data token and an application identifier.

A device match data token may be obtained using the characteristics of a playback device. Systems and methods for identifying a playback device using device match data and a device match data token that can be utilized in accordance with embodiments of the invention are disclosed in U.S. Patent Publication No. 2013/0007467 to Chan et al. entitled "Binding of Cryptographic Content using Unique Device Characteristics with Server Heuristics," the relevant disclosure from which is hereby incorporated by reference in its entirety. An application identifier can identify an application executing on a playback device, such as a playback application, and can be generated from data that is descriptive of the application. Systems and methods for generating and utilizing an application identifier in accordance with embodiments of the invention are disclosed in U.S. Patent Publication No. 2013/0054960 to Grab et al. entitled "Systems and Methods for Application Identification," the relevant disclosure from which is hereby incorporated by reference in its entirety.

Binding Content to a Playback Device

Figure 4:
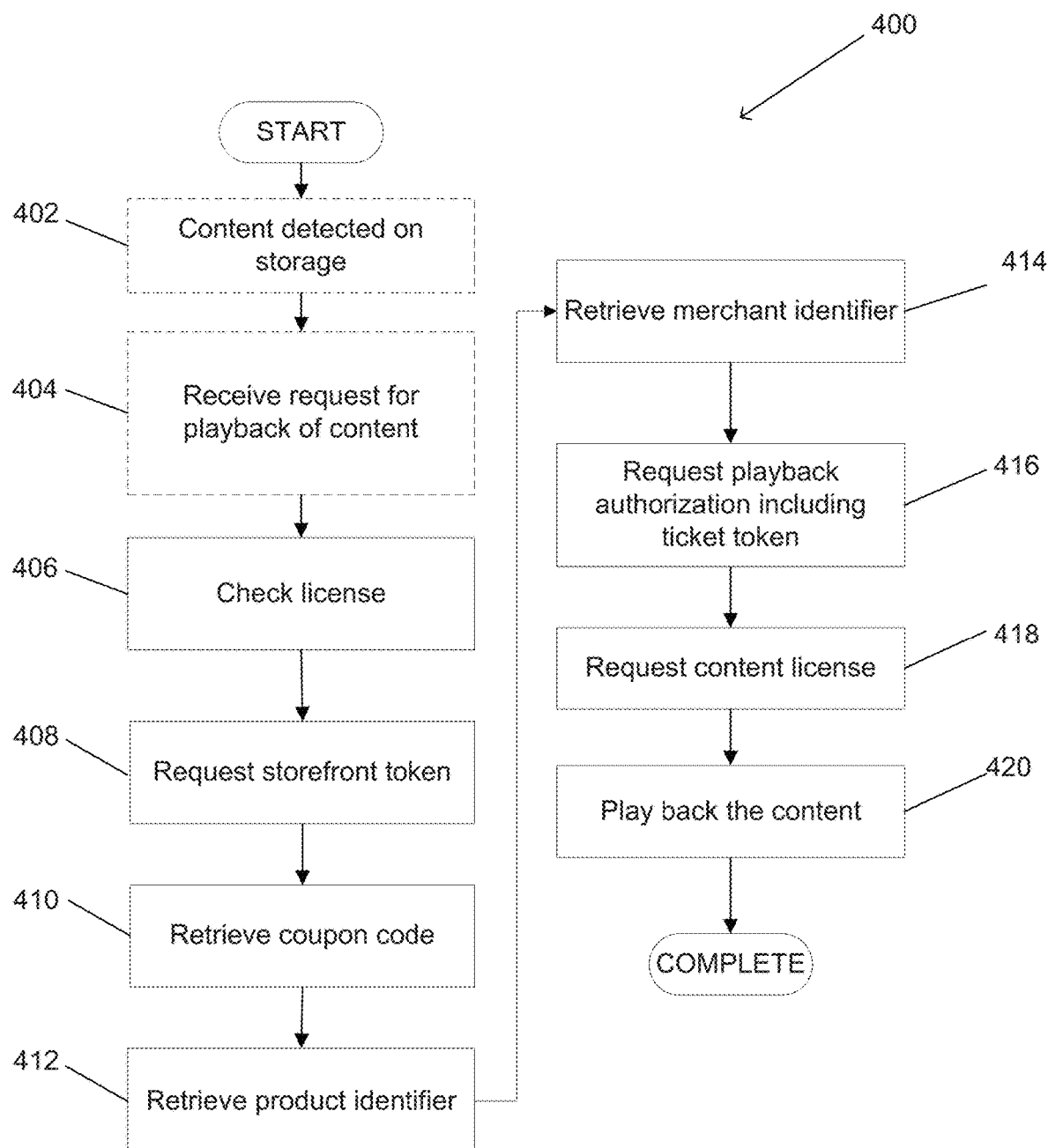
FIG. 4 is a flow chart illustrating a process for initializing and authorizing a piece of content for playback on a particular playback device, in accordance with an embodiment of the invention.

A process for initializing and authorizing a piece of content for playback on a particular playback device in accordance with embodiments of the invention is shown in FIG. 4. The process 400 illustrated in FIG. 4 can bind a piece of content to a combination of identifiers unique to a particular playback device and can provide the playback device with the license(s) and/or other digital rights management (DRM) credentials necessary to play back the content. In many embodiments, the process is triggered by a playback request. Events that may trigger the initiation of playback can include, but are not limited to, detecting a storage device containing multimedia content (402), launching a playback application, and/or receiving (404) a request for playback of content. In other embodiments, the initiation process is triggered manually through a user interface.

The initiation of playback can include launching a playback application and/or providing information about the content to play back such as a location or path name of the content to play, such as with a manifest file (e.g., a SMIL file such as discussed below) and/or file header. Such information about the content may identify the content and/or indicate a content identifier that identifies the content, and may also provide information for a playback device to determine whether a license file is needed to play the content and how a license file may be obtained. Content may be stored locally in volatile or non-volatile memory on a playback device, stored in non-volatile memory on a removable memory storage device that can be attached to the playback device, or streamed remotely from a content server using any of a variety of multimedia streaming protocols including schemes that utilize adaptive bitrate streaming (ABR). As appropriate to any particular application, any type of content distribution or content access may be utilized in accordance with embodiments of the invention.

As can be appreciated by one skilled in the art, a playback application may include one or more software modules that distribute functions or tasks involved with playing back content. In several embodiments of the invention, playback is initiated with a procedural call providing a SMIL (Synchronized Multimedia Integration Language) URL (uniform resource locator). In many embodiments, a piece of content for which playback is requested is associated with a content identifier. In further embodiments, a SMIL file containing content contains a content identifier associated with the content. In some embodiments, a SMIL file may contain addresses or references content files that can be retrieved over a network. In other embodiments, addresses or locations of content referenced in a SMIL file can be modified to point to content on a content storage device such as a removable memory storage device. Systems and methods for playback of content files that can be utilized in accordance with embodiments of the invention are disclosed in U.S. Patent Publication No. 2012/0173751 to Braness et al. entitled "Systems and methods for adaptive bitrate streaming of media stored in Matroska container files using hypertext transfer protocol" and U.S. Patent Publication No. 2013/0044821 to Braness et al. entitled "Systems and methods for encoding source media in Matroska container files for adaptive bitrate streaming using hypertext transfer protocol," the relevant disclosure from which is hereby incorporated by reference in its entirety.

The process may involve determining whether a license file enabling playback of the content exists and/or whether the license file is on the playback device (406). A license associated with the content may be stored locally with the content or stored remotely on a server such as a digital rights management (DRM) server. Determining if a license file exists may include parsing the SMIL, retrieving a content identifier from the SMIL, retrieving an ICP (Internet Cache Protocol) header location, and/or checking if an ICP header file exists. If there is a license, playback can commence. If the license is not present on the playback device, the device can proceed to request a license using identifiers such as, but not limited to, a storefront identifier and/or a coupon code.

In the illustrated embodiment, a request for a storefront token is sent (408) from the playback device to a digital rights management (DRM) server. The request may include one or more identifiers that identify the playback device, storefront application, and/or playback application. In many embodiments of the invention, a request for a storefront token includes at least a device match data token and/or an application identifier. A device match data token may be obtained using the characteristics of a playback device. Systems and methods for identifying a playback device using device match data and a device match data token that can be utilized in accordance with embodiments of the invention are disclosed in U.S. Patent Publication No. 2013/0007467 to Chan et al. entitled "Binding of Cryptographic Content using Unique Device Characteristics with Server Heuristics," the relevant disclosure from which is hereby incorporated by reference in its entirety. An application identifier can identify an application executing on a playback device, such as a playback application or storefront application, and can be generated from data that is descriptive of the application. Systems and methods for generating and utilizing an application identifier in accordance with embodiments of the invention are disclosed in U.S. Patent Publication No. 2013/0054960 to Grab et al. entitled "Systems and Methods for Application Identification," the relevant disclosure from which is hereby incorporated by reference in its entirety. In many embodiments, at least one application identifier utilized in a request for a storefront token is an identifier for a storefront application. In further embodiments, the identifiers can be distinguished in that an application identifier is unique to the application and applies to all instances where the application is installed and/or executing on different devices, while a storefront identifier is unique to each instance where the application (e.g., storefront application) is installed and/or executing on different devices. In further embodiments of the invention, any of a variety of identifying information that identifies a playback device, user account, user, and/or storage device (such as, but not limited to, a removable memory storage device) may be sent in a request for a storefront token in accordance with embodiments of the invention.

In several embodiments, the DRM server authenticates the playback device, generates a unique storefront identifier and associates the storefront identifier with the pairing of device match data token and application identifier. In some embodiments, a storefront identifier is created if this is the first time the storefront application has requested the playback of content (e.g., with that combination of identifiers sent in the request for a storefront token). The DRM server can generate a storefront token and associates the storefront token with the storefront identifier. The storefront token may be returned from the DRM server to the playback device. In several embodiments, a storefront identifier is considered sensitive information and playback devices and/or other devices are prevented from accessing a storefront identifier.

The process includes generating, reading or receiving (410) a coupon code. In many embodiments, a coupon code includes and/or may be generated using one or more coupon identifiers. In many embodiments, coupon identifiers uniquely identify a content storage device or a component of a storage device and are can be represented as alphanumeric strings stored in electronic format. Coupon identifiers may also include non-alphanumeric characters and/or be linked to other hardware or physical objects that represent a right to access content be as appropriate to a particular application. In some embodiments, a coupon code is a single coupon identifier while in other embodiments a coupon code is a combination of several coupon identifiers. In several embodiments, the coupon identifier(s) can be read from or derived from information that is read from a removable memory storage device as discussed below.

As would be appreciated by one skilled in the art, a storage device may include volatile or non-volatile memory in any of a variety of configurations that is accessible to a client playback device. For example, a storage device can be on-board memory within a playback device or can be a removable memory module such as a USB memory stick, USB drive, or secure digital (SD) memory card. On-board or removable memory may be in conformance with any of a variety of formats that are standardized or proprietary. Any memory on which content is stored for playback may be detected and the file system of removable memory that is attached to a playback device may be mounted such that it is accessible to applications on the playback device. In some embodiments of the invention, a removable memory storage device, such as a USB drive, containing content is connected to a playback device such as a TV. In other embodiments, a removable memory storage device may contain coupon identifiers but not content, and the content may be in local storage on-board the device or streamed. In several embodiments, the playback device may access the content remotely for playback or download the content dynamically from a remote location.

Coupon identifiers that can be read from a removable memory storage device in accordance with embodiments of the invention may include identifying information or information that is unique to the removable memory storage device or a component thereof such as, but are not limited to, a drive serial number, a USB serial number, an identifier stored within a coupon file, a circuit board identifier, and/or an interface identifier. In addition, coupon identifiers may be derived from such identifying or unique information using a function such as a hash function. A hash function is a procedure or algorithm that takes an arbitrary block of data and returns a fixed-size bit string, the hash value, such that an accidental or intentional change to the data will change the hash value. A hash function typically has four significant properties: it is easy to compute the hash value for a given input value, it is infeasible to generate an input value that has a given hash value, it is infeasible to modify an input value without changing the resulting hash value, and it is infeasible to find two input values with the same hash value. In several embodiments, one or more coupon identifiers are generated by passing one or more pieces of identifying information from a removable memory storage device through a hash function to determine a hash data value that is uniform in length and unique. This corresponding hash data value, being as unique as the raw source data, is just as representative of the identifying information as the raw data.

Coupon identifiers may be read from a removable memory storage device while it is attached to the playback device. In several embodiments, the removable memory storage device need not remain attached to the playback device other than when the coupon identifier is read. In other embodiments, the removable memory storage device must remain attached to the playback device throughout all or at least a portion of a playback authorization process or playback process. In some embodiments, one or more coupon identifiers are stored in a way that is indelible or tamper-resistant. In additional embodiments, one or more coupon identifiers are types of identifying information that can be read from a removable memory storage device and are difficult to spoof or imitate. In further embodiments, identifiers are received as input via an on-screen interface.

A product identifier may be retrieved (412) from memory on the playback device. The playback device may be assigned a product identifier by virtue of its classification as a product or within a product line. In several embodiments, a specific piece of content can be associated with one or more products. As will be discussed in greater detail below, the content may be allowed for play back on those products but not on other products. In this way, devices can be sold in a promotional manner such that certain content (e.g., movies) are bundled with certain products (e.g., TV model). Systems and methods for classifying and/or identifying a device as a product with a product identifier that may be utilized in accordance with embodiments of the invention are disclosed in U.S. Patent Publication No. 2013/0006869 to Grab et al. entitled "Method to identify consumer electronics products" and U.S. Patent Publication No. 2013/0007443 to Grab et al. entitled "Systems and methods for identifying consumer electronic products based on a product identifier," the relevant disclosure from which is hereby incorporated by reference in its entirety. In several embodiments, the product identifier is an eight character, alphanumeric string. In other embodiments, a product identifier may have any number of alphanumeric or non-alphanumeric characters as appropriate to the particular application.

A merchant identifier may be retrieved (414) from memory on the playback device. In several embodiments, a merchant identifier is a string that represents, and may be associated with, a merchant, retailer, or device manufacturer. In some embodiments, the merchant identifier is a four digit alphanumeric string. In other embodiments, a merchant identifier may have any number of alphanumeric or non-alphanumeric characters as appropriate to the particular application. Furthermore, a merchant identifier may be associated with other entities representative of a merchant or retailer, such as a branded or regional store or storefront. In various embodiments, a merchant identifier can be selected to designate any uniform presentation of the sale or access of content under a single brand as appropriate to a particular application. In many embodiments, a merchant identifier is provided to a DRM server (e.g., from a playback device to a CAC server and/or from a CAC server to a DRM server) and used by the DRM server in authorizing content playback.

The process includes requesting (416) playback authorization to obtain a ticket token. A request for a ticket token may include any of a number of pieces of information including, but not limited to, a content identifier, a storefront identifier, a coupon code, a product identifier, and/or a merchant identifier.

In several embodiments that include a separate content access control server, the playback device sends a request to a content access control (CAC) server and the content access control server communicates with a DRM server to request playback authorization. In other embodiments, a single server can act as both a CAC server and DRM server by executing processes of both a CAC application and a DRM application. Processes for requesting playback authorization to obtain a ticket token are discussed in greater detail further below.

A playback device may utilize a ticket token to request (418) a content license. A content license may be a license file or other form of data that enables the playback device to access the piece of content. A content license may also have associated cryptographic data (e.g., decryption keys) that can be used to decrypt the content. In several embodiments, a license file and/or associated cryptographic data is specific to the authorized playback device and cannot be used by another playback device. In this way, a license file may not be moved to another device and used to authorize playback. In various embodiments, a license file associated with the content may be stored locally with the content (e.g., in memory on the device or removable memory storage device), stored separately on the playback device, or stored remotely (e.g., on a license server or DRM server). The playback device can decode and play (420) the content.

Although a specific process is discussed above with respect to FIG. 4, any of a variety of processes may be performed to bind content in accordance with embodiments of the invention. Processes for requesting playback authorization are discussed below.

Requesting and Granting Playback Authorization

Figure 5:
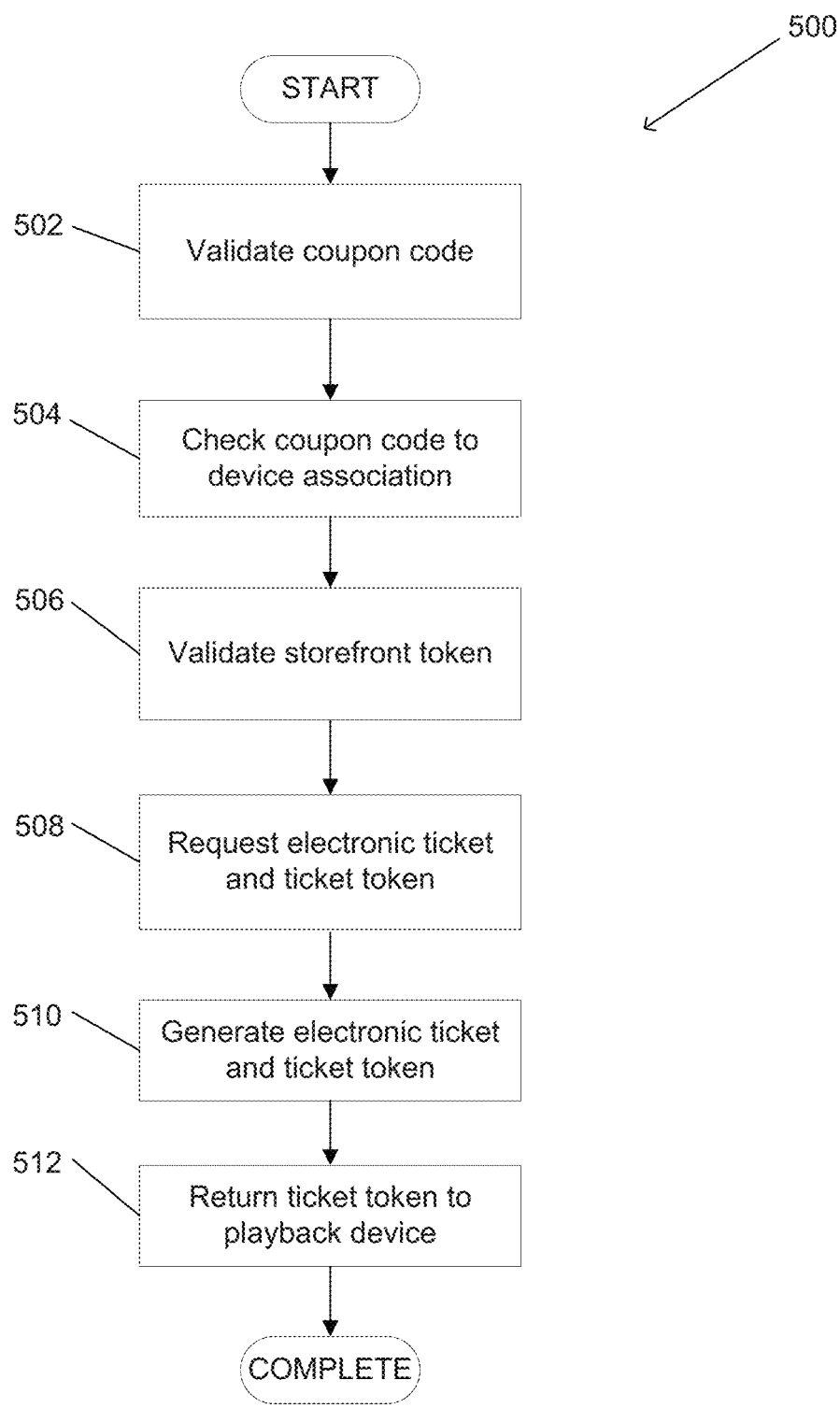
FIG. 5 is a flow chart illustrating a process for a playback device requesting playback authorization, in accordance with an embodiment of the invention.

A playback device can communicate with a content access control server to present identifiers and/or other credentials collected by the playback device and request authorization to play back the content. The content access control server may, in turn, communicate with a DRM server with some or all of the supplied parameters. In many embodiments, a playback device, DRM server, and content access control server communicate using a secure protocol such as Secure Sockets Layer (SSL). In some embodiments, both a DRM application and a content access control application may run on the same server. A process for requesting playback authorization in accordance with embodiments of the invention is illustrated in FIG. 5. The process 500 may commence with a content access control server receiving information that may include, but is not limited to, a content identifier, storefront token, coupon code, product identifier, and/or merchant identifier from a playback device as discussed further above.

The process 500 includes validating (502) a coupon code. In several embodiments, the coupon code is validated using the coupon code, content identifier, and product identifier. Validation can include verifying that the coupon code exists (e.g., was issued by a content owner or distributor or other entity with authority to grant rights to viewing content and stored in a database or other system for lookup/retrieval) and extracting a license identifier from a record associated with the coupon code. Validation may also include verifying that the coupon code has not yet been used (e.g., if already associated with a storefront identifier). In several embodiments, the coupon code is validated to see if the storage device is authorized for the product (e.g., device type). In many embodiments, the storage device is authorized for the product if the storage device, by its coupon code, is associated with the product identifier for that device type. In some embodiments, the product identifier to be verified is received from the playback device. The product identifier may include one or more product tags. The product identifier can be verified as belonging to a device type that is allowed to play the content for which playback is requested. In several embodiments, the coupon code is also verified as being associated with the content identifier of the piece of content to which access is being requested (e.g., content stored on an attached removable storage device or being streamed). If validation fails at any point, the process may be halted or remedial action to correct a failure may be taken.

The coupon code can be checked (504) to see if it has been associated with a playback device. In many embodiments, the verification is performed by a content access control server executing a content access control application as follows: If the coupon code is associated to the device by the storefront identifier of a storefront application on the playback device, the process continues to request a ticket (as will be discussed further below). If the coupon code is not associated to any device, then the coupon code is associated with the storefront identifier returned to the playback device as discussed above and the process continues to request a ticket. If the coupon code is associated with a device, but with a different storefront identifier, then a ticket is not requested. In other embodiments, validation may be performed using any of a variety of criteria to determine whether a ticket is or is not requested.

In several embodiments, merchant credentials are retrieved. Merchant credentials can be used to log in to a DRM server under a particular merchant account. A merchant identifier can be retrieved and used to retrieve merchant credentials. In many embodiments of the invention, merchant credentials include a login name and password.

The storefront token is validated (506) and used to retrieve a storefront identifier associated with the storefront token by providing the storefront token. In several embodiments, merchant credentials can be used to log into the DRM server and provide the storefront token. The storefront identifier that is associated with the received storefront token is provided in return. The DRM server expires the storefront token so it can no longer be used. In several embodiments, the storefront identifier is only used internally by the DRM server and is not provided to the playback device and/or the content access control server. In some embodiments, the storefront identifier is returned to the content access control server and the content access control server associates the coupon code with the storefront identifier.

In several embodiments, the process includes associating the coupon code with the storefront identifier. In additional embodiments, the content identifier is also associated with the coupon code and/or storefront identifier. Thereafter, combinations that include different values, such as having a different storefront identifier, may be prevented from playing back the content.

The process includes requesting (508) an electronic ticket and/or ticket token. In several embodiments, a request for an electronic ticket and/or ticket token includes the content identifier. In further embodiments, additional data may be required as part of a request such, but not limited to: a license identifier, a price, a currency, a country, a language, a transaction string, and/or merchant credentials. In many embodiments, a license identifier may specify what version or format of the content and/or what type of access to the content is granted. For example, a license identifier may indicate features of the rights to be granted such as, but not limited to: Ultra high definition (UHD or 4K), high definition (HD), or standard definition (SD) or other resolution version of the content, a limited time (e.g., 2-hour or 24-hour) rental, or a permanent ownership right. In some embodiments, one or more parameters of a license may have default values such that the parameters or license identifier need not be provided. In several embodiments, a license identifier may be represented as a numerical string where values correspond to the features discussed above. In some embodiments, a transaction string may include information that can be used to determine metrics about purchases and/or viewing patterns.

The process proceeds to generate (510) ticket token. In some embodiments, an electronic ticket may also be generated. In many embodiments, an electronic ticket and/or ticket token may serve as evidence of the right of a playback device registered with the DRM server to access DRM-protected content. A ticket token may be a temporary credential that can be used by a playback device to obtain the electronic ticket, a license, cryptographic information, and/or other information that may be needed in order to play back the content from the DRM server.

In many embodiments, a DRM server generates the electronic ticket and ticket token, and the ticket token (but not the electronic ticket) is sent to the playback device. In other embodiments, a ticket token is provided to the playback device but no electronic ticket is generated. In additional embodiments, the ticket token may be sent to the content access control (CAC) server and the CAC server in turn sends the ticket token to the playback device. In embodiments where the DRM server and CAC server are the same (e.g. using DRM and CAC applications on the single server), the DRM/CAC server can send the ticket token to the device. The ticket token can be sent from the playback device to the DRM server (or other server regulating access to content) to request a license for playing back the content. Systems and methods for utilizing electronic tickets and ticket tokens to facilitate the playback of content are disclosed in U.S. Patent Publication No. 2013/0179992 to Ziskind et al. entitled "Systems and methods for accessing digital content using electronic tickets and ticket tokens" and U.S. Patent Publication No. 2013/0179199 to Ziskind et al. entitled "Systems and methods for granting access to digital content using electronic tickets and ticket tokens," the relevant disclosure from which is hereby incorporated by reference in its entirety.

The playback device can proceed to request a license for the content and other information that can be used to facilitate playback. Although a specific process for requesting and granting playback authorization in accordance with embodiments of the invention is discussed above with respect to FIG. 5, any of a variety of processes may be utilized in accordance with embodiments of the invention. Processes for playing back content in accordance with embodiments of the invention are discussed below.

Playing Content

Figure 6:
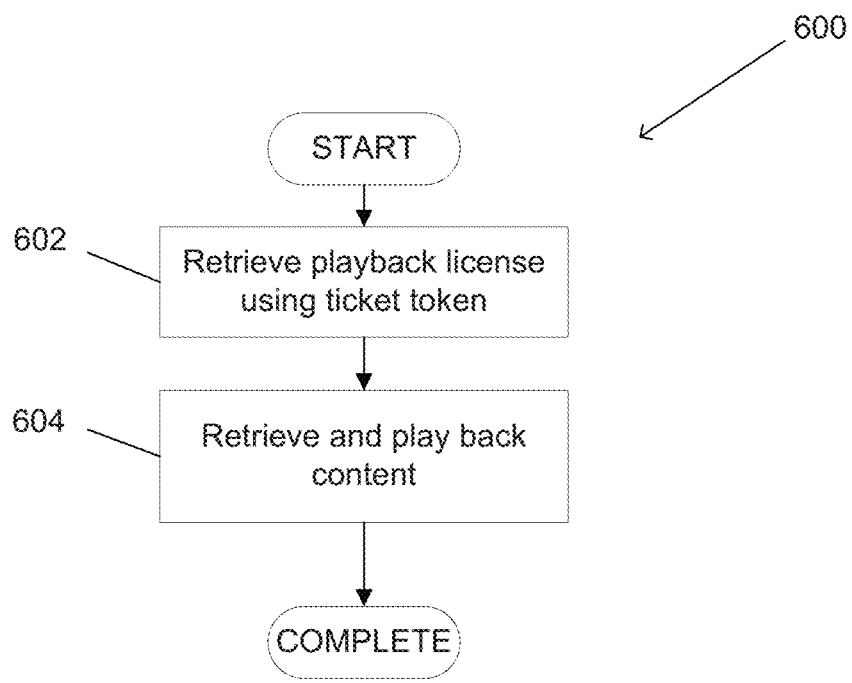
FIG. 6 is a flow chart illustrating a process for playing back content that is bound to a pairing of a playback device and removable memory storage device, in accordance with an embodiment of the invention.

In many embodiments of the invention, a playback device can use a ticket token evidencing the pairing of a playback device to a removable memory storage device for a particular piece of content to obtain playback rights from a DRM server. A process for playing back content that is bound to a pairing of a playback device and removable memory storage device in accordance with embodiments of the invention is shown in FIG. 6.

The process 600 includes sending a ticket token to a DRM server to retrieve (602) a playback license. Retrieving a playback license can include authenticating the device, validating the ticket token, generating a SMIL file, and/or providing the SMIL file, license and ICP header to the playback device. A license may be provided as a license file that the playback device can download and store. The ICP header may be stored with the SMIL file on local storage in the playback device.

The playback device can retrieve (604) the content using the SMIL file, ICP header, and/or license file. Content may be streamed from a remote server or stored locally on the playback device or an external storage device such as a USB drive. Playback may be performed via any of a variety of content playback techniques including those described in U.S. Patent Publication No. 2012/0173751 and U.S. Patent Publication No. 2013/0044821 incorporated by reference above.

Although a specific process for playing back content is discussed above with respect to FIG. 6, any of a variety of processes may be utilized in accordance with embodiments of the invention.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A playback device configured to conduct playback of media content subject to digital rights management (DRM), the playback device comprising:
   a processor; and
   a non-volatile storage medium containing an application for causing the processor to perform the steps of:
      receiving a manifest file comprising network location data for accessing media content over a network;
      retrieving media content from a content server over the network based on the received manifest file;
      storing the retrieved media content on a removable storage medium;
      receiving a DRM license from a DRM server over the network;
      storing the DRM license on the removable storage medium;
      modifying the received manifest file to describe the location of the media content and the stored DRM license on the removable storage medium; and
      parsing the modified manifest file to play back the stored media content from the removable storage medium using the stored DRM license.

2. The playback device of claim 1, wherein:
   at least a portion of the media content is encrypted; and
   the DRM license can be used to decrypt the media content.

3. The playback device of claim 1, wherein:
   the manifest file is encrypted; and
   the DRM license can be used to decrypt the manifest file.

4. The playback device of claim 1, wherein the application further causes the processor to perform the step of transmitting a request for a DRM license to a DRM server, wherein the request for the DRM license comprises identifying information describing the playback device.

5. The playback device of claim 1, wherein the DRM license further binds the media content to a user account.

6. The playback device of claim 1, wherein the removable storage medium is a secure digital (SD) card.

7. The playback device of claim 1, wherein the playback device is a cellphone.

8. A playback device configured to conduct playback of media content subject to digital rights management (DRM), the playback device comprising:
   a processor; and
   a non-volatile storage medium containing an application for causing the processor to perform the steps of:
      receiving a manifest file comprising network location data for accessing media content over a network;
      storing the manifest file in the non-volatile storage medium;
      retrieving media content from a content server over the network based on the received manifest file;
      storing the retrieved media content on a removable storage medium;
      receiving a DRM license from a DRM server over the network;
      storing the DRM license;
      modifying the stored manifest file to describe the location of the media content on the removable storage medium and the stored DRM license; and
      parsing the modified manifest file to access a stored DRM license and to play back the stored media content from the removable storage medium.

9. The playback device of claim 8, wherein at least a portion of the media content is encrypted; and wherein the DRM license can be used to decrypt the media content.

10. The playback device of claim 8, wherein the manifest file is encrypted; and wherein the DRM license can be used to decrypt the manifest file.

11. The playback device of claim 8, wherein the application further causes the processor to perform the step of transmitting a request for a DRM license to a DRM server, wherein the request for the DRM license comprises identifying information describing the playback device.

12. The playback device of claim 8, wherein the DRM license further binds the media content to a user account.

13. The playback device of claim 8, wherein the removable storage medium is a secure digital (SD) card.

14. The playback device of claim 8, wherein the application further causes the processor to perform the step of storing the DRM license in the non-volatile storage medium.

15. The playback device of claim 8, wherein the application further causes the processor to perform the step of storing the DRM license in the removable storage medium.

16. The playback device of claim 8, wherein the playback device is a cellphone.

17. A method for conducting playback of media content subject to digital rights management (DRM), comprising:
 receiving a manifest file comprising network location data for accessing media content over a network;
 retrieving media content from a content server over the network based on the received manifest file;
 storing the retrieved media content on a removable storage medium;
 receiving a DRM license from a DRM server over the network;
 storing the DRM license;
 modifying the received manifest file to describe the location of the media content on the removable storage medium and the stored DRM license; and
 parsing the modified manifest file to access the stored DRM license and to play back the stored media content from the removable storage medium using the playback device.

18. The method of claim 15, wherein at least a portion of the media content is encrypted; and wherein the DRM license can be used to decrypt the media content.

19. The method of claim 15, wherein the DRM license is stored in the non-volatile storage medium.

20. The method of claim 15, wherein the DRM license is stored in the removable storage medium.

* * * * *